United States Patent
Hasama

(10) Patent No.: US 8,724,137 B2
(45) Date of Patent: May 13, 2014

(54) INFORMATION PROCESSING APPARATUS AND MEMORY MANAGEMENT TECHNIQUE FOR SECURE PRINT DATA

(75) Inventor: Yuichi Hasama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 153 days.

(21) Appl. No.: 13/490,823

(22) Filed: Jun. 7, 2012

(65) Prior Publication Data

US 2012/0327454 A1    Dec. 27, 2012

(30) Foreign Application Priority Data

Jun. 23, 2011    (JP) .................................. 2011-139735

(51) Int. Cl.
*G06F 3/12*    (2006.01)

(52) U.S. Cl.
USPC .................. 358/1.14; 358/1.13; 358/1.15

(58) Field of Classification Search
None
See application file for complete search history.

(56) References Cited

U.S. PATENT DOCUMENTS

2002/0131059 A1 *    9/2002    Tsuchitoi ...................... 358/1.1

FOREIGN PATENT DOCUMENTS

EP              0575167 B1 *   12/1993
JP              11-212744 A    8/1999

* cited by examiner

*Primary Examiner* — Eric A Rust
*Assistant Examiner* — Haris Sabah
(74) *Attorney, Agent, or Firm* — Canon U.S.A., Inc. IP Division

(57) ABSTRACT

State information about whether a printing apparatus can store print data for confidential printing is acquired. When the print data can be stored, secure information and print data are transmitted, and when the print data cannot be stored, the print data is transmitted after performing authentication based on the secure information.

21 Claims, 14 Drawing Sheets

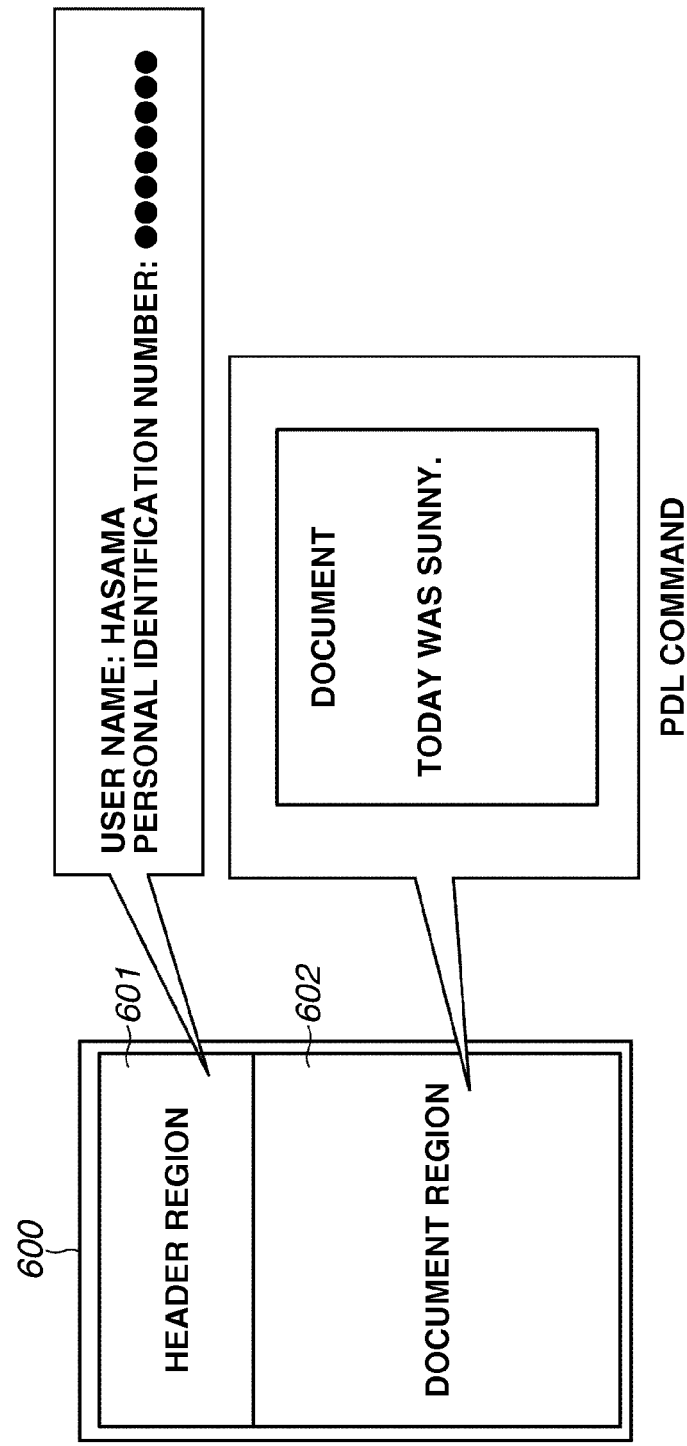

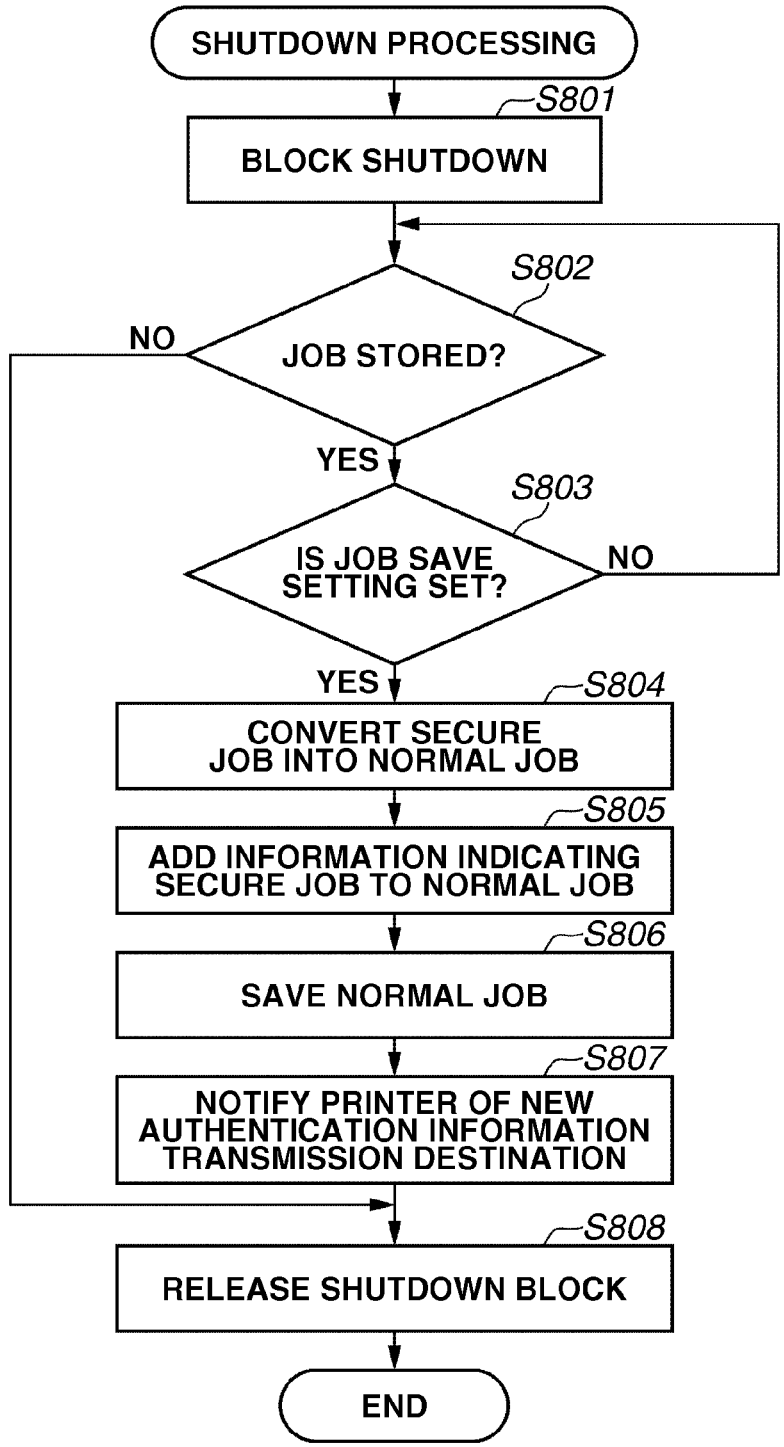

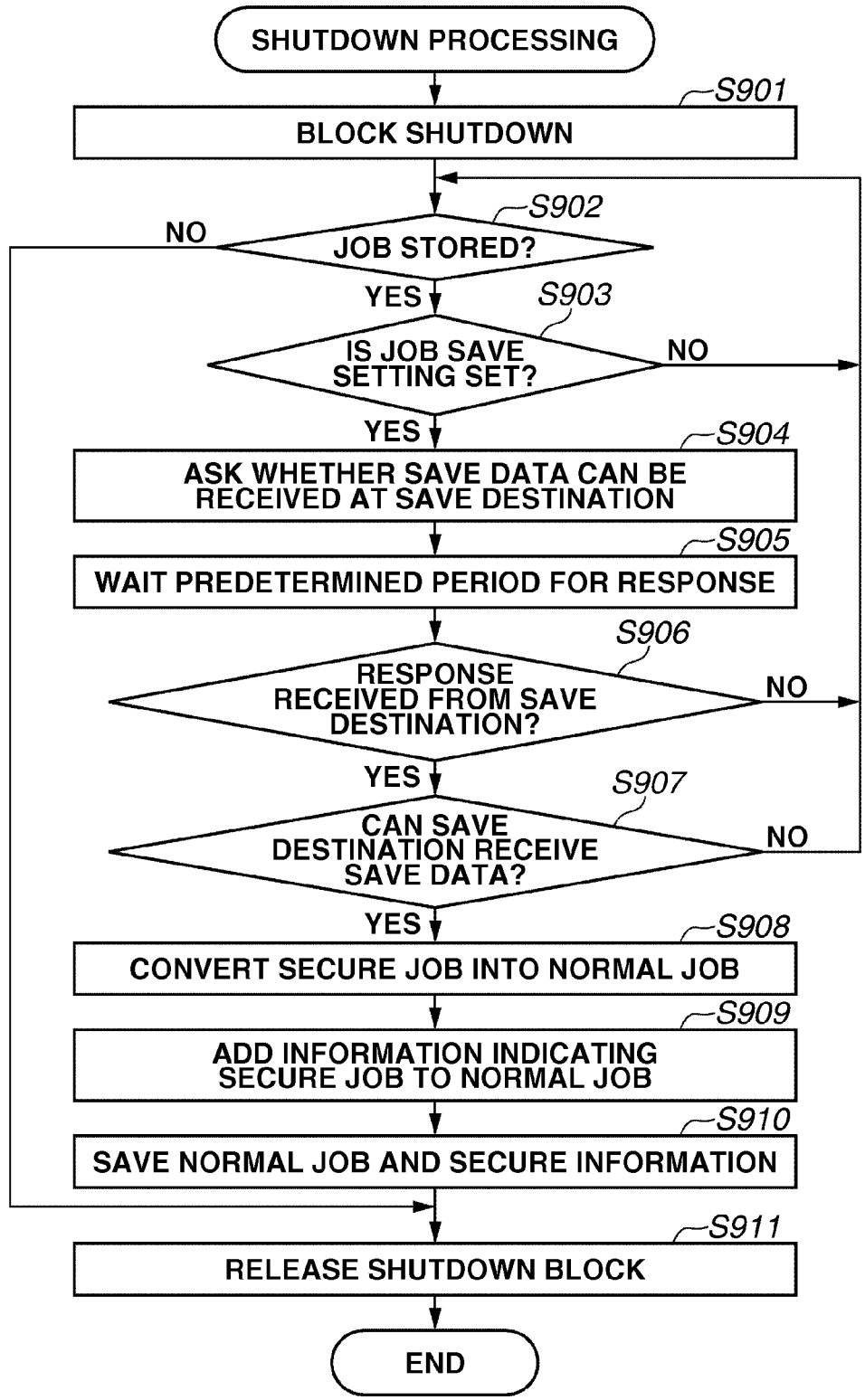

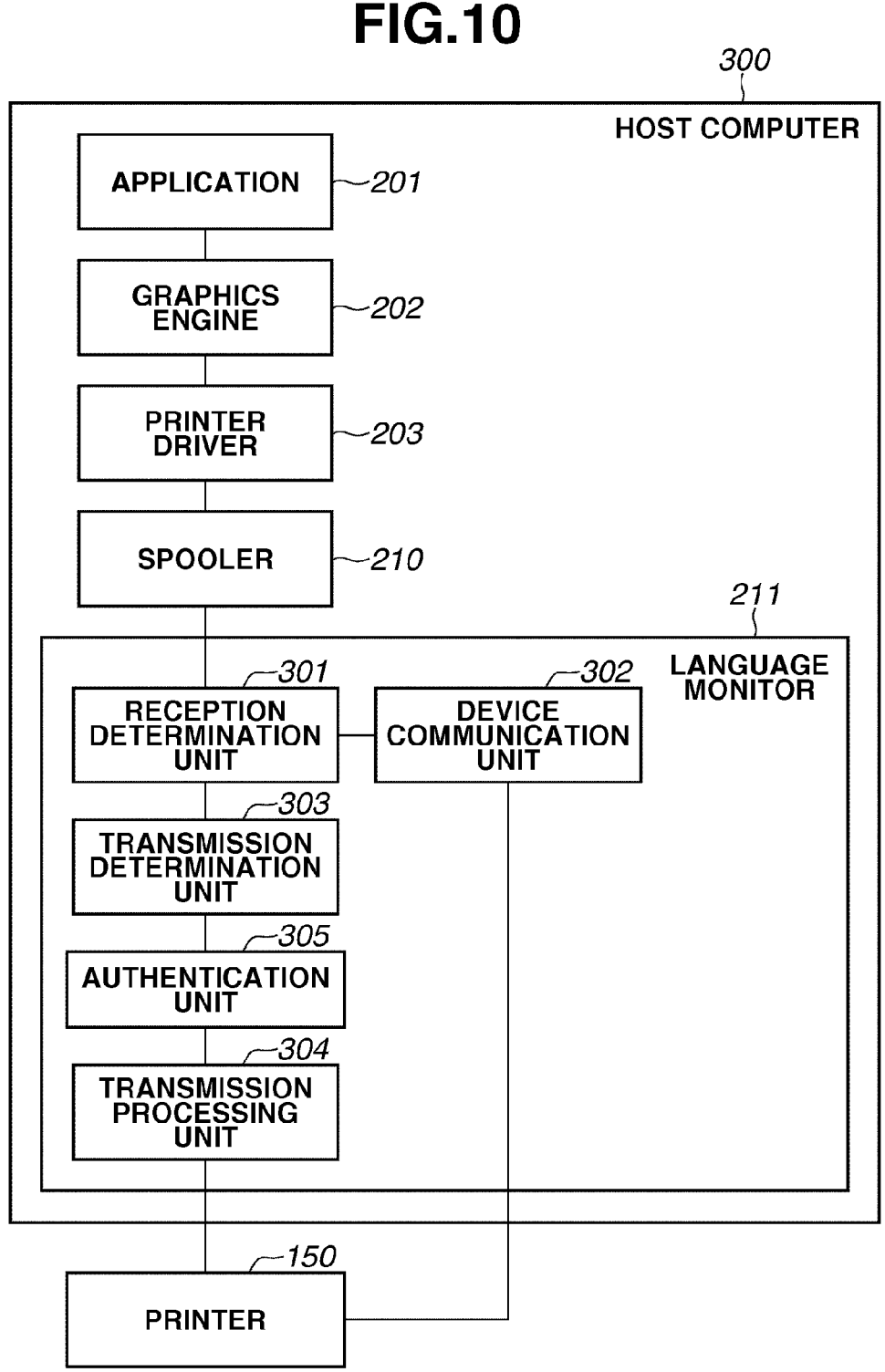

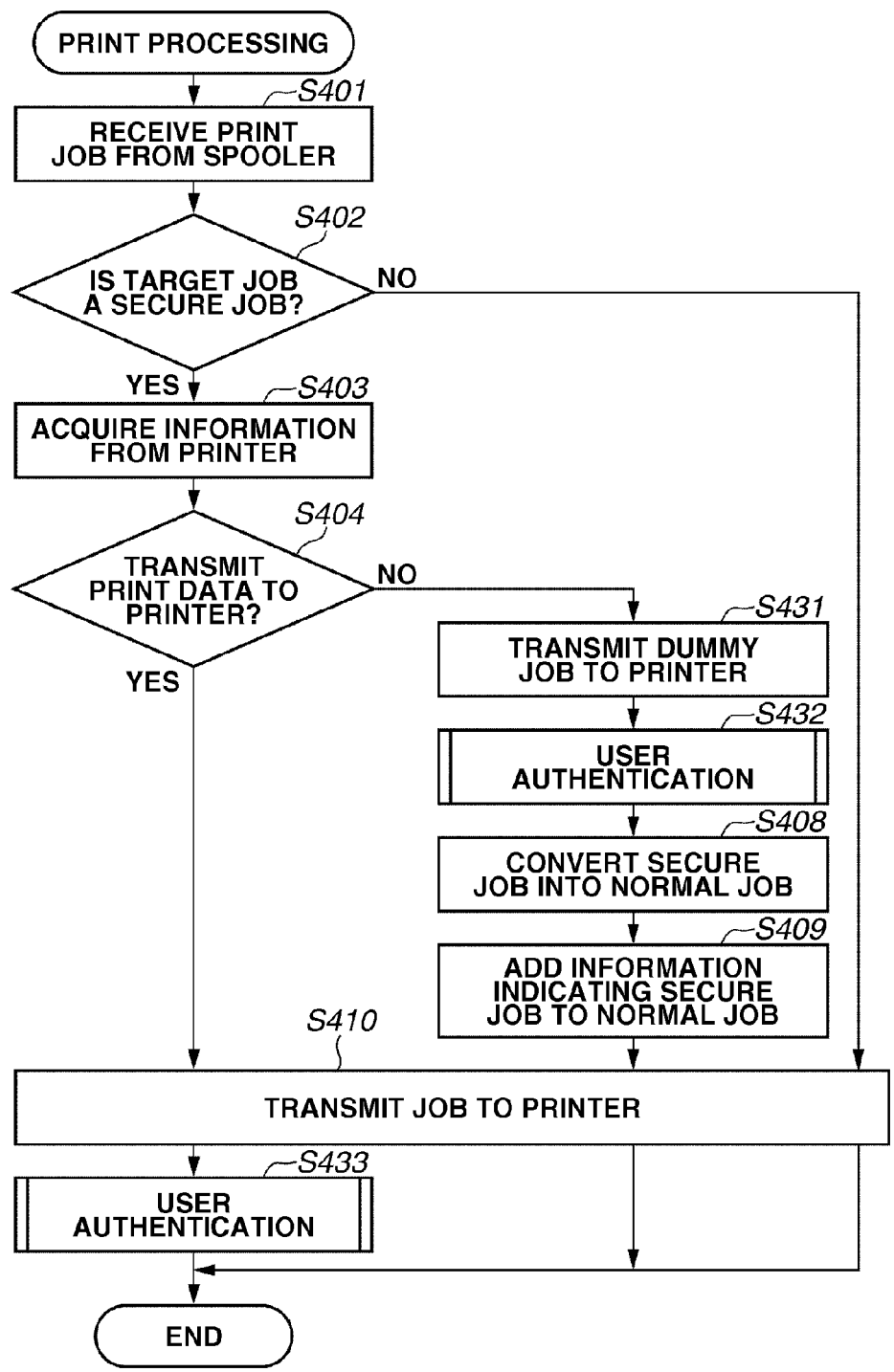

INFORMATION PROCESSING APPARATUS AND MEMORY MANAGEMENT TECHNIQUE FOR SECURE PRINT DATA

BACKGROUND OF THE INVENTION

1. Field of the Invention

The present invention relates to an information processing apparatus that instructs a printing apparatus to perform confidential printing.

2. Description of the Related Art

Recently, to shorten the time after a printing instruction until printing starts, there has been a demand to mount a storage device with a capacity capable of storing a predetermined number of print jobs in a printing apparatus. Japanese Patent Application Laid-Open No. 11-212744 discusses a printing apparatus including such a storage device, which is configured so that to shorten the time after a printing instruction until printing starts, print data for a secure job is transmitted to the printing apparatus from an information processing apparatus before user authentication.

However, since a printing apparatus configured in this manner cannot store more print data than its capacity, when the capacity is exceeded, the information processing apparatus cannot transmit new print data, which prevents confidential printing from being performed.

SUMMARY OF THE INVENTION

According to an aspect of the present invention, an information processing apparatus is configured to instruct a printing apparatus to perform confidential printing in which print processing is started after authentication processing is performed by transmitting secure information to be used in the authentication processing to an authentication unit which performs the authentication processing and transmitting print data to be used in the print processing by the printing apparatus to the printing apparatus. The information processing apparatus includes a communication unit configured to communicate bidirectionally with the printing apparatus, an acquisition unit configured to acquire state information indicating whether the print data can be stored in the printing apparatus until the print processing is performed from the printing apparatus by the communication unit, and a transmission unit configured to, if the state information indicates that the print data can be stored, transmit the secure information to the authentication unit and transmit the print data to the printing apparatus before performing the authentication processing, and if the state information indicates that the print data cannot be stored, transmit the secure information to the authentication unit before performing the authentication processing, and then transmit the print data to the printing apparatus after authentication by the authentication unit based on the secure information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates a configuration of a secure job that includes secure information and print data.

FIG. 8 is a flowchart illustrating shutdown processing performed in a language monitor when an authentication unit is in a printer.

FIG. 9 is a flowchart illustrating shutdown processing performed in a language monitor when an authentication unit is in a host computer.

FIG. 10 illustrates the functional components for the processing steps performed when an authentication unit is in a host computer.

FIG. 11 is a flowchart illustrating print processing performed in a language monitor when an authentication unit is in a host computer.

DESCRIPTION OF THE EMBODIMENTS

Various exemplary embodiments, features, and aspects of the invention will be described in detail below with reference to the drawings.

Unless stated otherwise, as long as the functions of the present invention can be executed, the present invention may obviously be applied in a system configured from a single device or from a plurality of devices. Further, unless stated otherwise, as long as the functions of the present invention can be executed, the present invention can also obviously be applied in a system configured so that processing is performed via a network, such as a local area network (LAN) or a wide area network (WAN), connected to the system.

Further, a print setting can be set not only by a printer driver, but also by an application.

Figure 1:
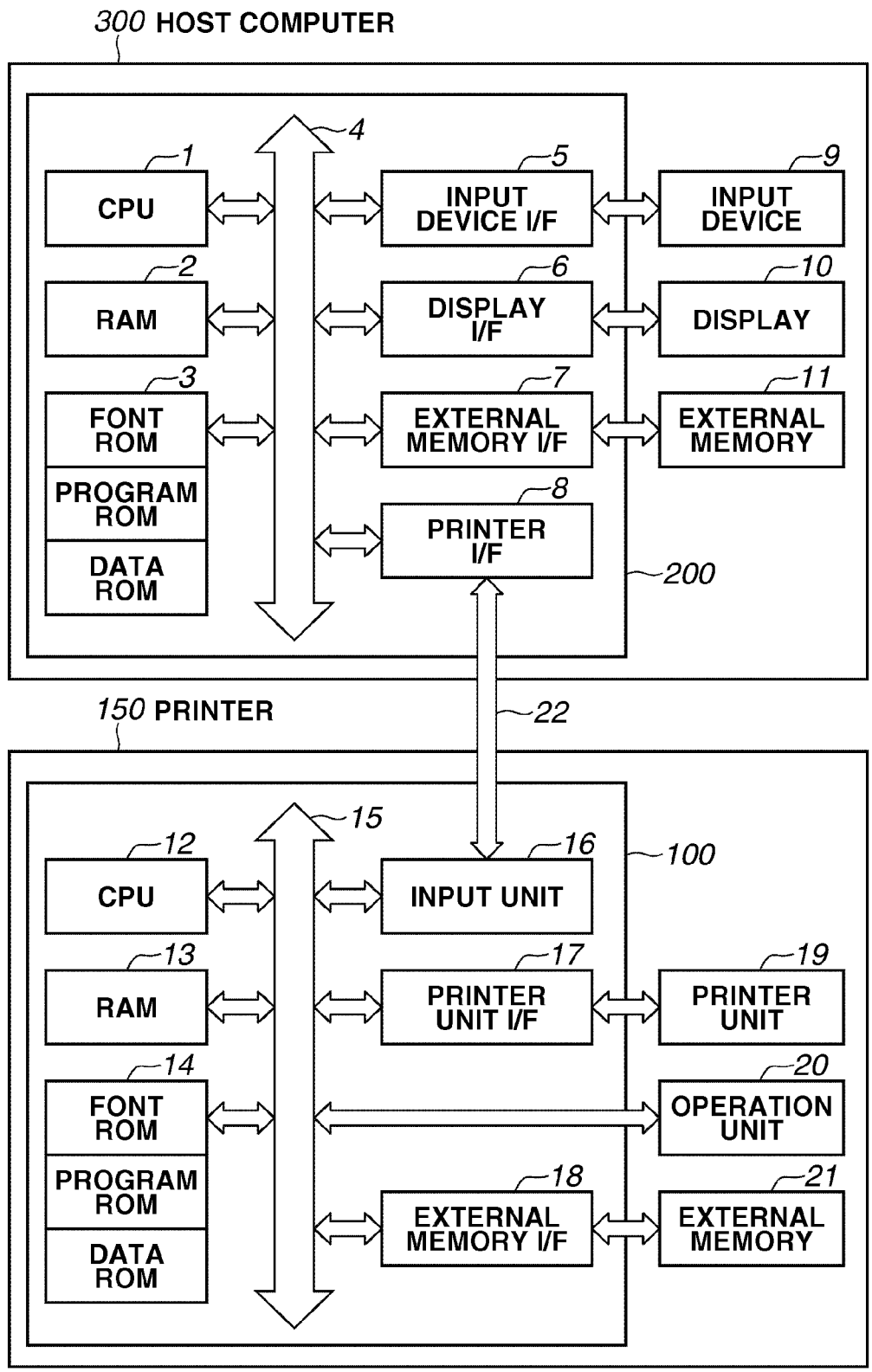
FIG. 1 is a system block diagram of a host computer and a printer.

In FIG. 1, a host computer 300 includes a central processing unit (CPU) 1 which executes document processing in which graphics, images, characters, tables (including spreadsheets etc.) and the like are mixed, based on a document processing program or the like which is stored in a program read-only memory (ROM) in a ROM 3 or in an external memory 11. The CPU 1 comprehensively controls each of devices which are connected to a system bus 4.

An operating system program (hereinafter "OS"), which is a control program of the CPU 1, is stored in the program ROM in the ROM 3 or in the external memory 11. Font data used during the above document processing is stored in a font ROM in the ROM 3 or in the external memory 11. Various kinds of data used during the above document processing are stored in a data ROM in the ROM 3 or in the external memory 11.

A random access memory (RAM) 2 functions as a main memory or a work area of the CPU 1. An input device interface (I/F) 5 controls inputs from an input device 9, which is a keyboard or a pointing device. A display I/F 6 controls the display on a display 10. An external memory I/F 7 controls access to the external memory 11, which is a hard disk (HD), a Floppy disk (FD) or the like. The external memory 11 stores a boot program, various applications, font data, user files, editing files, a printer driver, and the like.

A printer I/F 8 is connected to a printer 150 via a bidirectional communication pathway 22, and executes communication control processing with the printer 150. The communication pathway 22 may be a network connection, a universal serial bus (USB) connection, an infrared connection or the like, via wired or wireless communication.

The CPU 1 opens a program window for the program ROM in the ROM 3 based on a mouse cursor input on a graphical user interface (GUI) displayed on the display or a key input from the keyboard, and executes various types of data processing. Consequently, when a user executes printing, a window relating to the printing settings is opened, so that the printer settings and the setting of the print processing method for the printer driver, including selection of a printing mode, can be performed.

In the printer 150 communicating with the host computer 300, a CPU 12 outputs an image signal as output information to a printer unit (printer engine) 19 connected to a system bus 15 based on a control program.

Further, a program ROM in a ROM 14 stores a control program that the CPU 12 controls the printer 150. A font ROM in the ROM 14 stores font data, for example, that is used when generating the above output information. A data ROM in the ROM 14 stores information that is used by the host computer if the printer does not include an external memory 21, which is a storage device such as a hard disk (HD).

The CPU 12 can perform communication processing with the host computer 300 via an input unit 16, and can notify the host computer 300 of information in the printer. A RAM 13 functions as a main memory or a work area of the CPU 12. The RAM 13 is configured so that its memory capacity can be expanded using an optional RAM connected to an expansion port. The RAM 13 is used as an output information storage region for storing a raster, which is output information, an environment data storage region, and the like. Access to the external memory 21 is controlled by an external memory I/F 18.

Figure 2:
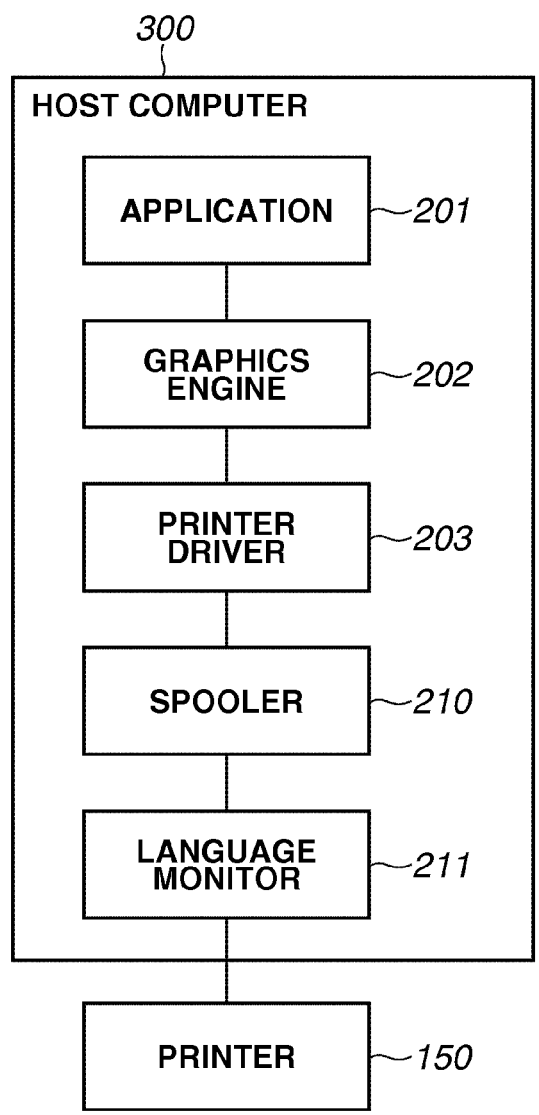
FIG. 2 illustrates the functional components of a typical print system.
Figure 3:
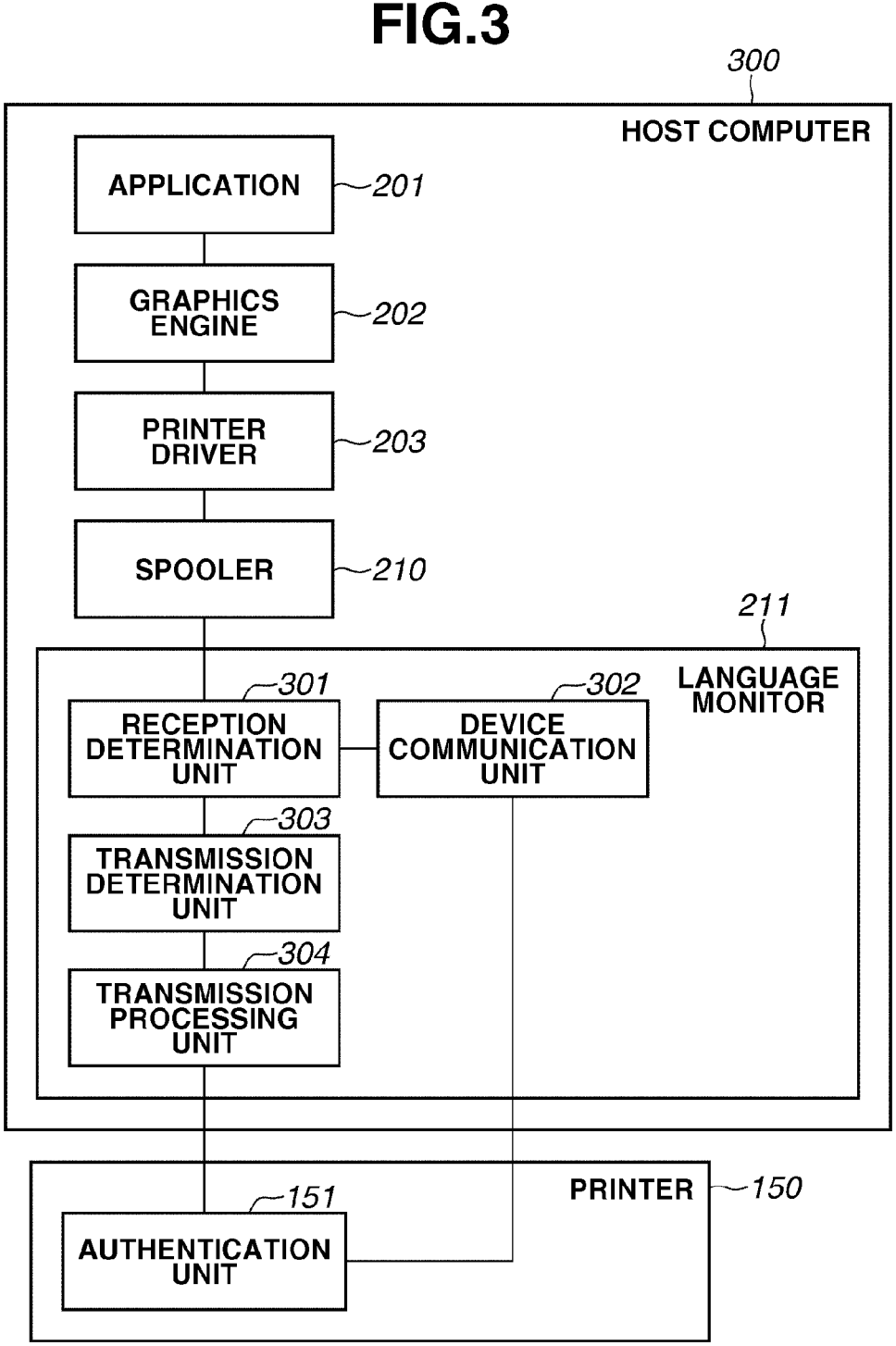
FIG. 3 illustrates the functional components for the processing steps performed when an authentication unit is in a printer.

The software configuration of the host computer 300 illustrated in FIG. 2, 3 or 10, and the processing performed in each processing illustrated in flowcharts are realized by the CPU 12 executing processing based on programs stored in the ROM 14 or the external memory 21.

The external memory 21 can be optionally connected for storing font data, form data, and the like. An operation panel 20 is provided with a touch panel or a numerical keypad for operating the printer main body. Further, the number of external memories 21 is not limited to one. At least one or more thereof is included. The external memory 21 can be configured so that a plurality of external memories storing an optional font card in addition to the built-in fonts and a program for interpreting printer control languages of different language systems can be connected.

FIG. 2 is a configuration diagram of a typical print processing performed in a host computer that is connected to a printing apparatus, such as a printer, either directly or via a network. An application 201, a graphics engine 202, a printer driver 203, a spooler 210, and a language monitor 21 are present as files stored in the external memory 11.

These files are executed by being called up by the OS or a program and loaded into the RAM 2. The application 201 and the printer driver 203 may be added to a FD, a CD-ROM in the external memory 11, or a HD of the external memory 11 via a network.

As described above, the application 201 is loaded into the RAM 2 from the external memory 11 and executed. When using the printer 150 to perform printing from the application 201, output (drawing) is performed utilizing the graphics engine 202 which has similarly been loaded into the RAM 2 and made ready for execution.

The graphics engine 202 loads the printer driver 203, which has been prepared for each printing apparatus, from the external memory 11 into the RAM 2. The printer driver 203 converts the output (document data) of the application 201 into a print job based on the print setting of the printer driver 203. The converted print job is output to the printer 150 from the spooler 210, which has been loaded into the RAM 2 by the OS, via the language monitor 211 and then the communication pathway 22.

FIG. 3 illustrates an example of the configuration of the language monitor 211 and the printer 150 according to the present exemplary embodiment. In the present exemplary embodiment, the language monitor 211 includes a reception determination unit 301 that receives a print job, a device communication unit 302 that performs communication, a transmission determination unit 303 that determines whether to transmit the print job, and a transmission processing unit 304 that transmits the print job.

Print processing performed in the language monitor 211 according to the present exemplary embodiment will be described below with reference to a flowchart illustrated in FIG. 4.

When document printing is executed from the application 201, the printer driver 203 is called via the graphics engine 202. Next, the printer driver 203 transmits a print job generated by converting document data into a print command, which is referred to as a page description language (PDL), based on a print setting to the spooler 210.

Then, in step S401, the spooler 210 calls the language monitor 211 designated by the printer driver 203, and the reception determination unit 301 receives the print job from the spooler 210. In step S402, the reception determination unit 301 determines whether a personal identification number or a password is set in the print job received in step S401.

Figure 5:
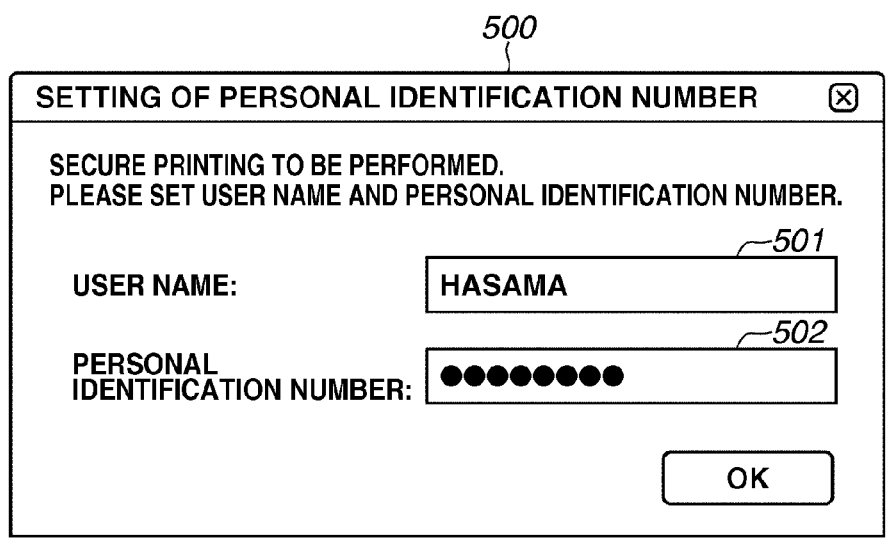
FIG. 5 illustrates a user interface for setting secure information.

FIG. 6 illustrates an example of a print job for which a personal identification number is set (i.e., a secure job). A header region 601 in a secure job 600 illustrated in FIG. 6 includes a user name 501 and a personal identification number 502, which are secure information set by a user interface 500 in the printer driver 203 illustrated in FIG. 5. Further, a document region 602 in the secure job 600 includes print data converted into a PDL.

In the print job, the header region is stored as setting data. The setting data includes the secure information and a print setting other than the secure information. The print job is configured from setting data and print data, in which the document region is stored as the print data. Unless stated otherwise, in the present exemplary embodiment, the print data is included in the print job.

In the present exemplary embodiment, although the secure information is set by the printer driver 203, the secure information can also be set by the application 201 or the language monitor 211. Further, the user name 501 does not have to be set.

Examples of secure information other than a user name and a personal identification number may include a password, a contact type or non-contact type key or card, biometrics, and a combination of these. However, the present exemplary embodiment will be described based on setting the user name 501 and the personal identification number 502.

In step S402, if it is determined that a personal identification number is not set for the print job (NO in step S402), the processing proceeds to step S410. In step S410, the transmission processing unit 304 transmits a normal print job, in which a personal identification number is not set, to the printer 150, and a print product is output.

On the other hand, if it is determined that a personal identification number is set for the print job (YES in step S402), the processing proceeds to step S403. In step S403, the device communication unit 302 communicates with the printer 150, and acquires information i.e., state information, that will be necessary in step S404. As described below, the state information is information that indicates whether the print data can be stored until the printing apparatus performs print processing.

Figure 7A:
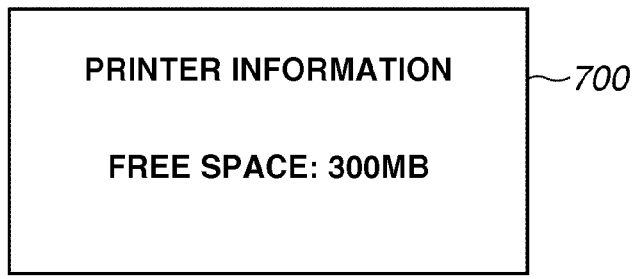
FIGS. 7A to 7D illustrate information that is exchanged between a host computer and a printer.
Figure 7B:
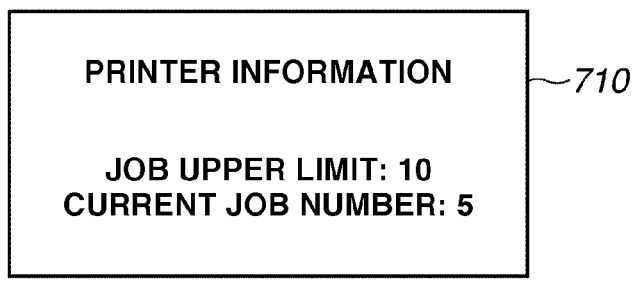

In the present exemplary embodiment, the state information is information 700 illustrated in FIG. 7A about the free space in the external memory 21 of the printer 150. In addition, information 710 illustrated in FIG. 7B may also be acquired. The information 710 indicates an upper limit for the number of print jobs that can be currently stored in the external memory 21 by the printer 150, and the number of print jobs that are actually stored at the moment.

Figure 7C:
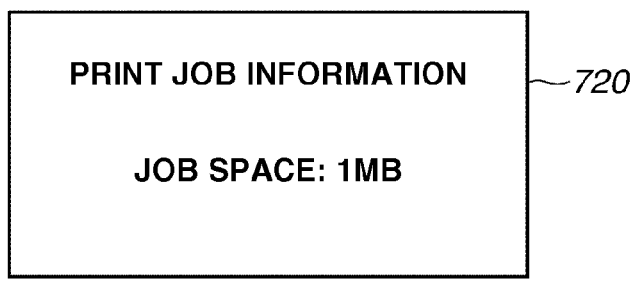
Figure 7D:
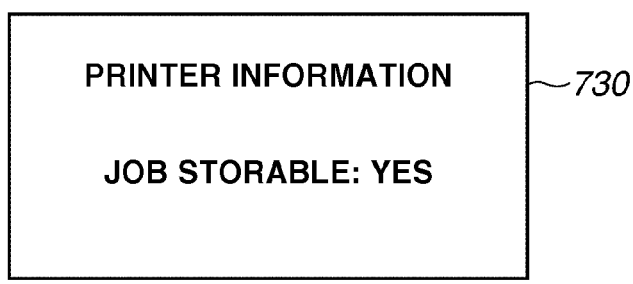

Print job information 720 as illustrated in FIG. 7C, for example, can also be transmitted from the device communication unit 302 in the host computer 300 to the printer 150. Further, information 730 as illustrated in FIG. 7D indicating whether a print job can be stored in the external memory 21 by the printer 150 can also be acquired from the printer 150. More specifically, the information 720 is information generated by calculating a secure job size and a total size A of the setting data and the print data. The information 730 is information generated by comparing a size B of the print jobs that can be stored by the printer 150 and the size A of the information 720. The information 730 indicates that a print job can be stored when the size A does not exceed the size B, and indicates that a print job cannot be stored when the size A exceeds the size B.

In step S404, the transmission determination unit 303 determines whether to transmit the secure job 600 to the printer 150 based on the information acquired in step S403. In the present exemplary embodiment, whether to transmit the secure job 600 to the printer 150 is determined by comparing the information 700 indicating the free space of the external memory 21 in the printer 150 acquired by the transmission determination unit 303 in step S403 with the size of the print data or the print job. More specifically, if the size of the print data or the print job does not exceed the size indicated by the information 700, since the printing apparatus can store print data, it is determined to transmit the secure job 600 (YES in step S404). On the other hand, if the size of the print data or the print job exceeds the size indicated by the information 700, since the printing apparatus cannot store print data, it is determined not to transmit the secure job 600 (NO in step S404).

If acquiring the information 710 in step S403, it is determined whether to transmit the secure job 600 to the printer 150 based on whether the printer upper limit will be exceeded when the next print job is transmitted. More specifically, if the upper limited has been reached, since print data cannot be stored, the secure job 600 is not transmitted. If the upper limited has not been reached, since print data can be stored, the secure job 600 is transmitted. If the upper limit for the number of print jobs in the printer is uniquely determined by the printer model, a local file or database that separately stores the print job upper limit may be referred to.

If acquiring the information 730 from the printer 150, it is determined whether to transmit the secure job 600 to the printer 150 based on the acquired information 730.

In step S404, if it is determined that the secure job 600 can be transmitted to the printer 150 (YES in step S404), the processing proceeds to step S410. In step S410, the secure job 600 is transmitted to the printer 150. Then, an authentication unit 151 that performs user authentication, i.e., authentication processing, compares and determines whether the personal identification number input corresponding to the secure job selected on the panel of the printer 150 and the personal identification number 502 of the secure job 600 match each other. If they do match, i.e., after authentication processing is successful, a print product is output based on the print data. If they do not match, the printer 150 stores the secure job until it is authenticated, and confidential printing is not performed.

On the other hand, if it is determined that the secure job 600 cannot be transmitted to the printer 150 (NO in step S404), the processing proceeds to step S405. In step S405, the transmission processing unit 304 transmits only the secure information (i.e., the user name 501 and the personal identification number 502) input in the header region 601 of the secure job 600 to the authentication unit 151 in the printer 150, and then the processing proceeds to step S406. When a job name is displayed in a list of jobs in the printer 150, the secure information and the job name can be transmitted to the authentication unit 151.

After the host computer 300 transmitted the secure information to the printer 150, if a job having only secure information is selected on the panel in the printer 150, the personal identification number (input information) input for the job having only secure information is transmitted to the authentication unit 151. Then, the authentication unit 151 determines whether the input personal identification number matches the personal identification number 502 in the secure information.

More specifically, the printer 150 determines whether the information input to the printer 150 is correct. If the input information is correct, the host computer 300 receives authentication information indicating that user authentication was successful.

The user authentication is configured in the following manner in a case where both a user name and personal identification number are required to be input for the user authentication. More specifically, the user name input to the printer 150 and the user name 501 in the secure information, and the personal identification number input to the printer 150 and the personal identification number 502 in the secure information are respectively compared, and determined whether they match. The similar processing is performed for user authentication based on biometrics, a key, or a card.

In step S406, if the transmission processing unit 304 has not received the authentication information from the authentication unit 151 in the printer 150 (NO in step S406), then in step S407, the transmission processing unit 304 suspends the print data transmission until the authentication information is received from the printer 150. When the authentication information is received (YES in step S406), the processing proceeds to step S408.

In step S408, the transmission processing unit 304 deletes the secure information in the header region 601 of the secure job 600, and converts the job into a normal print job that does not include a personal identification number or a password. Then, the processing proceeds to step S409.

Next, in step S409, the transmission processing unit 304 adds information indicating that the job is the secure job 600, i.e., metadata, to the header region of the print job. Consequently, since an administrator of the printer 150 can manage the print job as the secure job, when looking at a print job log of the printer 150, for example, the administrator can retrieve the fact that the job is the secure job as metadata.

Then, in step S410, the transmission processing unit 304 transmits the normal print job that includes information in the header region indicating that the job is the secure job 600 to the printer 150, and a print product is output.

Figure 4:
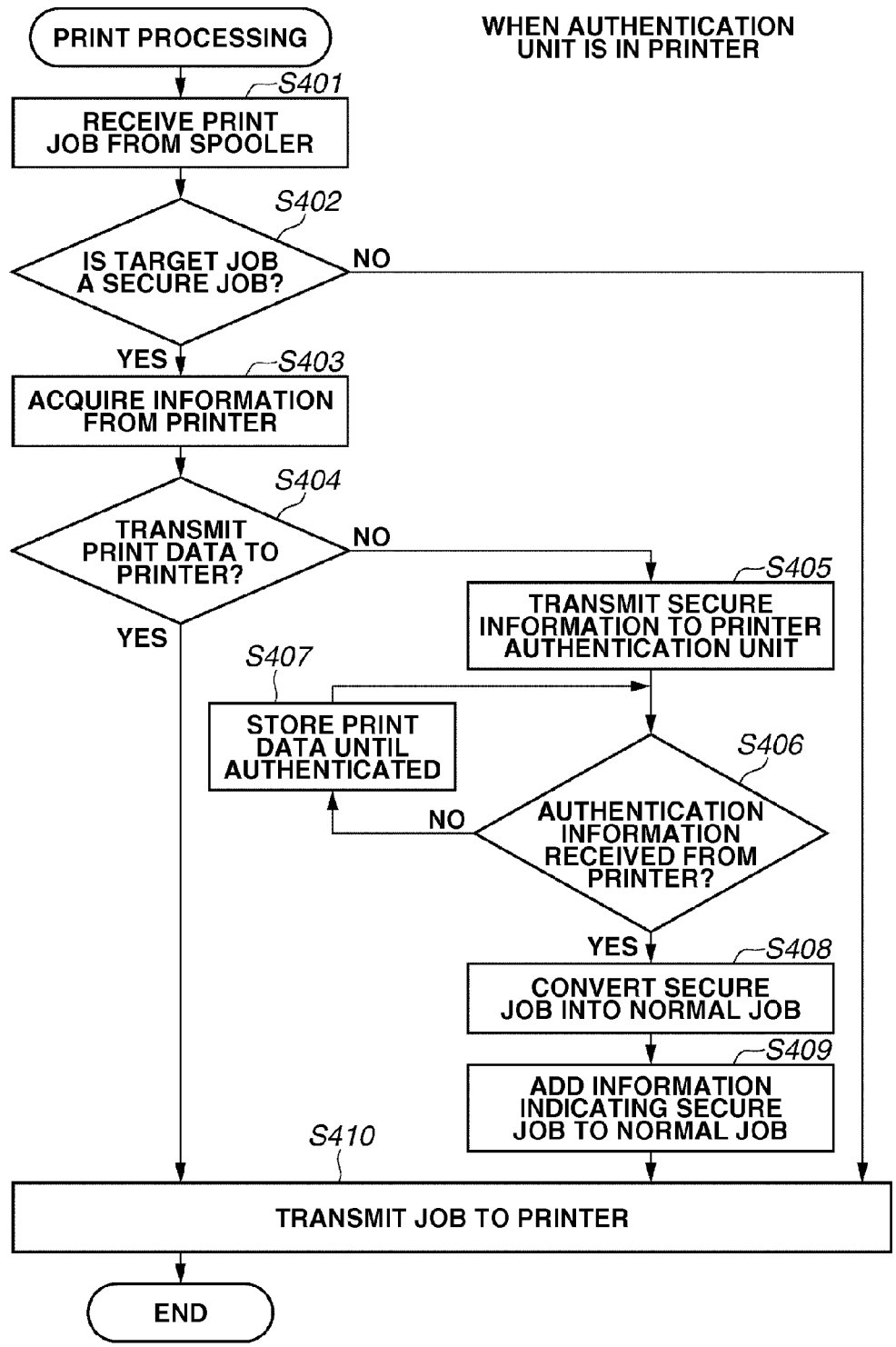
FIG. 4 is a flowchart illustrating print processing performed in a language monitor when an authentication unit is in a printer.

If processing is performed based on the flowchart illustrated in FIG. 4, when there is a free space in the printer storage device, confidential printing can be executed by transmitting the print data before user authentication. Even if there is no free space, confidential printing can be executed by transmitting the print data after user authentication.

In the present exemplary embodiment, although the printer includes the authentication unit, an authentication server provided for the printer may include the authentication unit. In this case, the personal identification number is input by the authentication server, and the host computer receives the authentication information from the authentication server.

In this case, the printer and the authentication server can be regarded as an integrated printing apparatus.

A second exemplary embodiment in which the authentication unit is on the host computer side will now be described. In the present exemplary embodiment, as illustrated in FIG. 10, an authentication unit 305 is in the language monitor and exists between the transmission determination unit 303 and the transmission processing unit 304. However, the location of the authentication unit 305 is not limited, as long as it can receive the secure information included in the secure job and input information from the printer 150. Further, the authentication unit 305 may be a program or a module other than a printer driver, a port monitor, a print processor, or a language monitor.

The printing flow according to the present exemplary embodiment will be described based on the flowchart illustrated in FIG. 11. In FIG. 11, the processing in steps S401 to S404 and steps S408 to S410 are the same as in FIG. 4. Therefore, only the steps other than those will be described.

In step S431, the transmission processing unit 304 transmits a dummy job for performing confidential printing to the printer 150, and the processing proceeds to a module S432.

The dummy job is a print job that does not include print data or that is empty. If printing of the dummy job is selected by the printer 150, input of the personal identification number to the input panel of the printer 150 is requested just as with normal confidential printing. The printer 150 transmits the personal identification number input by the user, i.e., the input information, to the host computer 300.

Although the dummy job does not include print data, to distinguish the dummy job from other print jobs in the printer 150, the dummy job may be transmitted including a job name or a user name. If a job name or a user name is included, the printer 150 displays the job name and the user name in the job list based on those names.

Figure 12:
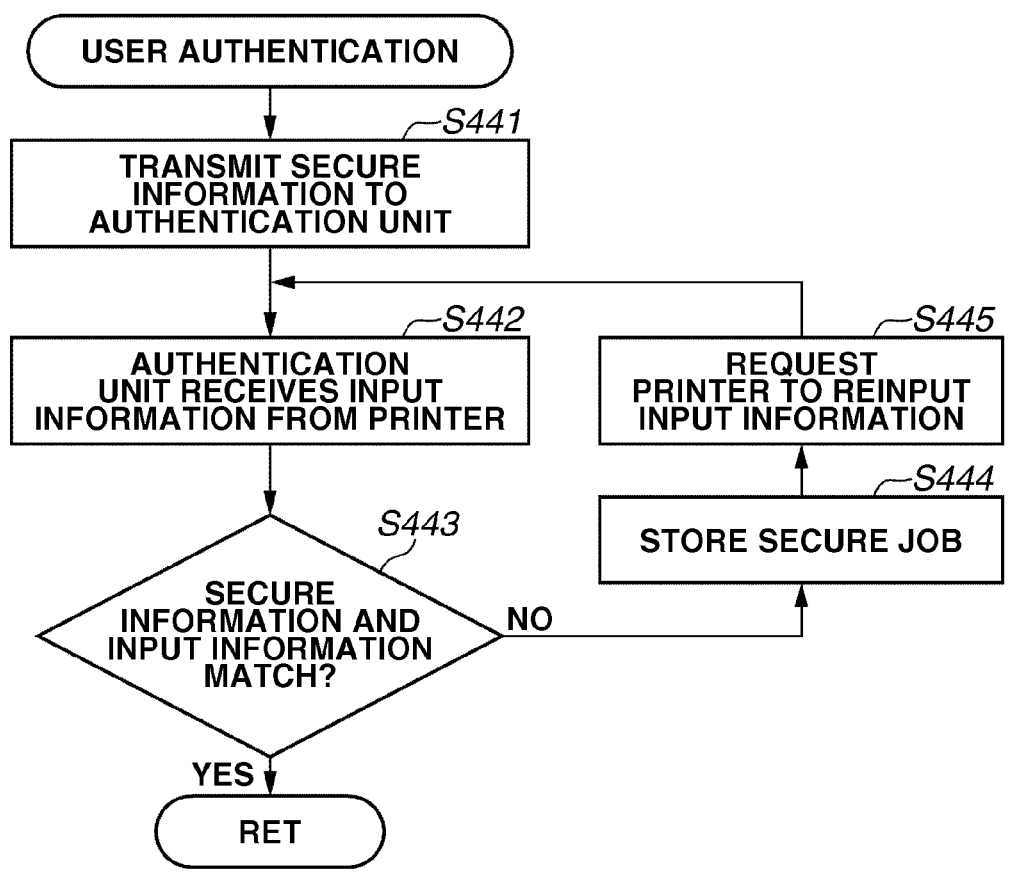
FIG. 12 is a flowchart illustrating user authentication in print processing performed in a language monitor or in a save personal computer (PC) service.

FIG. 12 illustrates a flowchart of a user authentication module. In step S441 of the module S432, the transmission determination unit 303 transmits the secure information (i.e., the user name 501 and the personal identification number 502) input in the header region 601 of the secure job 600 to the authentication unit 305, and then the processing proceeds to step S442.

In step S442, the authentication unit 305 receives the input information notified from the printer 150, and the processing proceeds to step S443. In step S443, the authentication unit 305 determines whether the input information notified from the printer 150 matches the personal identification number 502. If the input information matches the personal identification number 502 (YES in step S443), the processing proceeds to step S408 in FIG. 11. If the input information does not match the personal identification number 502 (NO in step S443), the processing proceeds to step S444.

In step S444, the transmission processing unit 304 stores the secure job in the host computer 300, and the processing proceeds to step S445. In step S445, the transmission processing unit 304 issues a request to the printer 150 for re-input of the personal identification number, and the processing returns to step S442. The printer 150 receives the request, and requests the user to re-input the personal identification number. Alternatively, the printer 150 displays an error message, and keeps the dummy job in the job list. Consequently, the user can input the personal identification number by again instructing printing of the dummy job.

After the processing in the module S432 has finished, in step S410, the print data is transmitted to the printer 150, and then the printer 150 discards the dummy job, and printing is performed based on the print data transmitted in step S410

In step S404, if it is determined that the print data is transmitted to the printer (YES in step S404), in step S410, the secure information is not transmitted to the printer 150. Instead, the printer 150 adds information requesting user authentication to the header region in the job similar to a dummy job, and the processing proceeds to a module S433. The module S433 executes the same processing as the module S432, so that confidential printing is executed.

The advantage of the second exemplary embodiment is that it is not necessary to transmit secure information to the printer. Consequently, since the secure information is not transmitted via the communication pathway if an instruction is issued for confidential printing, the secure information is not leaked externally even if the information is intercepted at the communication pathway, for example.

In the print processing in the first and second exemplary embodiments, there is an issue that when user authentication has not finished even though the secure information has already been transmitted to the authentication unit, if the host computer is shutdown, the print data is not transmitted to the printer, so that printing is not performed.

In a third exemplary embodiment, print processing will be described for a case in which, if the host computer is shutdown before user authentication, confidential printing is performed by having the host computer save print data in another computer.

(When Printer Includes Authentication Unit)

In the present exemplary embodiment, the processing performed during shutdown of the language monitor 211 when the authentication unit 151 is in the printer 150 will be described with reference to the flowchart illustrated in FIG. 8.

The processing illustrated in FIG. 8 starts when a user instructs the OS to shutdown.

In step S801, the reception determination unit 301 instructs the OS to block shutdown by the host computer 300, and the processing proceeds to step S802. In step S802, the reception determination unit 301 determines whether there are any secure jobs 600 still stored in the language monitor 211. If it is determined that there are no secure jobs 600 still stored in the language monitor 211 (NO in step S802), the processing proceeds to step S808. In step S808, the reception determination unit 301 instructs the OS to release the shutdown block placed on the host computer 300 in step S801, and shutdown processing is finished.

On the other hand, if it is determined that there is the secure job 600 still stored in the language monitor 211 (YES in step S802), the processing proceeds to step S803. In step S803, the transmission determination unit 303 determines whether a job save setting is set.

Figure 14:
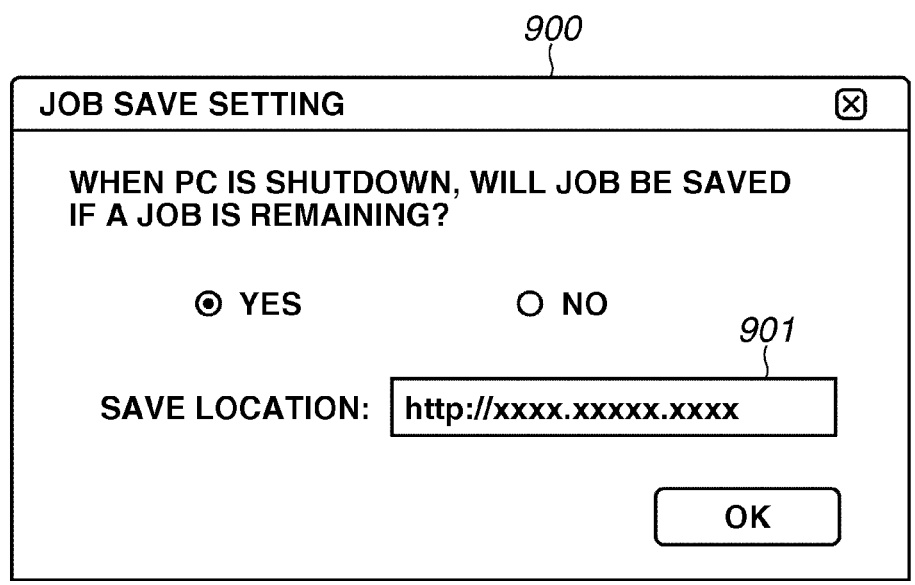
FIG. 14 illustrates a user interface for setting a job save setting.

FIG. 14 illustrates an example of a user interface for a job save setting 900 in the printer driver 203 according to the present exemplary embodiment. The user can set a job save setting using the user interface.

In the present exemplary embodiment, although the job save setting is set by the printer driver 203, the job save setting can also be set by the printer 150. The job save setting can be set as a part of the initial settings when the printer 150 is installed. Further, when the job save setting is set in the printer 150, the device communication unit 302 acquires job save setting information from the printer 150.

In step S803, if it is determined that the job save setting is not set (NO in step S803), the processing returns to step S802. Consequently, the instruction to shut down the host computer 300 is blocked until either in step S802 the jobs still stored in the language monitor 211 are all gone, or in step S803 the job save setting is set.

On the other hand, if it is determined that the job save setting is set (YES in step S803), the processing proceeds to step S804. In step S804, the transmission processing unit 304 deletes the secure information in the header region 601 of the secure job 600, and converts the job into a normal print job that does not include a personal identification number or a password.

In step S805, the transmission processing unit 304 adds information indicating that the job is the secure job 600 to the header region of the print job. Then, in step S806, the transmission processing unit 304 transmits the normal print job in which the information indicating that the job is the secure job 600 is included in the header region to an external information processing apparatus based on job save location information 901 in the job save setting, and the processing proceeds to step S807.

In step S807, the device communication unit 302 notifies the printer 150 that the external information processing apparatus, which is the job save destination, is a new transmission destination for the authentication information. By transmitting information about the new authentication information transmission destination to the printer 150, the authentication information is notified from the printer 150 to the job save destination if the user authentication is executed by the authentication unit in the printer. When the job save destination receives the authentication information from the printer 150, the normal print job in which the information indicating that the job is the secure job 600 is included in the header region is transmitted to the printer 150.

In step S808, the reception determination unit 301 instructs the OS to release the shutdown block placed on the host computer 300 in step S801, and shutdown processing is finished.

The external information processing apparatus used in the present exemplary embodiment can have the same configuration as the host computer illustrated in FIG. 1, or can be a file server such as a network attached storage (NAS) device.

(When Host Computer Includes Authentication Unit)

Next, the processing performed during shutdown of the language monitor 211 when the authentication unit is in the host computer 300 will be described with reference to the flowchart illustrated in FIG. 9.

In step S901, the reception determination unit 301 instructs the OS to block shutdown by the host computer 300, and the processing proceeds to step S902.

In step S902, if shutdown is performed by the host computer 300, the reception determination unit 301 determines whether there are any secure jobs 600 still stored in the language monitor 211. If it is determined that there are no secure jobs 600 still stored in the language monitor 211 (NO in step S902), the processing proceeds to step S911. In step S911, the reception determination unit 301 instructs the OS to release the shutdown block placed on the host computer 300 in step S901, and shutdown processing is finished.

On the other hand, if it is determined that there is the secure job 600 still stored in the language monitor 211 (YES in step S902), the processing proceeds to step S903. In step S903, the transmission determination unit 303 determines whether the job save setting is set.

FIG. 14 illustrates the example of the user interface for the job save setting 900 in the printer driver 203 according to the present exemplary embodiment. The user can set the job save setting using the user interface.

In the present exemplary embodiment, although the job save setting is set by the printer driver 203, the job save setting can also be set by the printer 150. Further, when the job save setting is set in the printer 150, the device communication unit 302 acquires the job save setting information from the printer 150.

In step S903, if it is determined that the job save setting is not set (NO in step S903), the processing returns to step S902. Consequently, the instruction to shut down the host computer 300 is blocked until either in step S902 the jobs still stored in the language monitor 211 are all gone, or in step S903 the job save setting is set.

On the other hand, if it is determined that the job save setting is set (YES in step S903), the processing proceeds to step S904. In step S904, the transmission determination unit 303 makes an inquiry to the save destination about whether the external information processing apparatus, which is the job save destination in the job save setting 900, can receive the save data, and the processing proceeds to step S905.

In step S905, the transmission determination unit 303 waits for a predetermined period until there is a response to the inquiry made in step S904. Next, in step S906, the transmission determination unit 303 determines whether there has been a response to the inquiry made in step S904. If there has been a response (YES in step S906), the processing proceeds to step S907, and if there has not been a response (NO in step S906), the processing returns to step S902.

In step S907, the transmission determination unit 303 determines whether the save destination can receive the save data based on the response obtained in steps S904 to S906. If it is determined that the save destination can receive the save data (YES in step S907), the processing proceeds to step S908. Whereas, if it is determined that the save destination cannot receive the save data (NO in step S907), the processing returns to step S902.

In step S908, the transmission processing unit 304 extracts the secure information included in the header region 601 of the secure job 600, and converts the job into a normal job that does not include a personal identification number or a password.

In step S909, the transmission processing unit 304 adds information indicating that the job is the secure job 600 to the header region of the normal print job converted in step S908.

In step S910, the transmission processing unit 304 transmits the secure information extracted in step S908 and the normal print job generated in step S909 based on the job save location information 901 in the job save setting.

In step S911, the reception determination unit 301 instructs the OS to release the shutdown block placed on the host computer 300 in step S901, and shutdown processing is finished.

As described above, the secure information is also transmitted to the job save destination, so that user authentication can be performed at the job save destination. If the user authentication is executed by the authentication unit at the job save destination, the job save destination transmits to the printer 150 the normal print job in which information indicating that the job is the secure job 600 is included.

Figure 13:
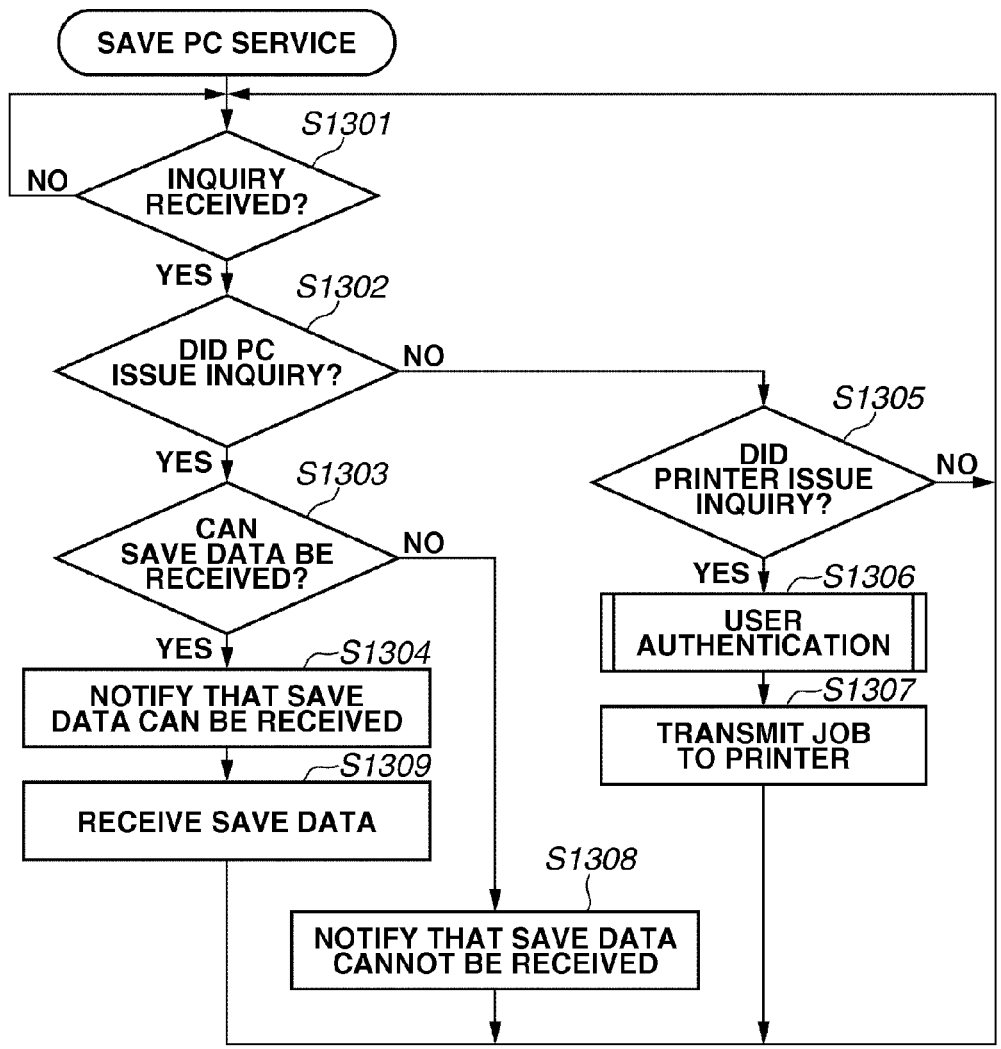
FIG. 13 is a flowchart illustrating a save PC service executed by an external information processing apparatus.

A save personal computer (PC) service executed by the external information processing apparatus of the save destination to which the inquiry is made in step S904 in FIG. 9 will now be described with reference to FIG. 13.

The configuration of the external information processing apparatus in this case is the same as that of the host computer illustrated in FIG. 1. The save PC service illustrated in FIG. 13 and the user authentication illustrated in FIG. 12 are read into the RAM from the program ROM in the external information processing apparatus, and executed by the CPU.

In the following, the device that makes an inquiry about the saving is a PC, and the device that makes an inquiry about the user authentication is a printing apparatus.

In step S1301, it is determined whether the external information processing apparatus has received an inquiry. If it is determined that the inquiry has been received (YES in step S1301), the processing proceeds to step S1302. Whereas, if the inquiry has not been received (NO in step S1301), the external information processing apparatus waits until it does receive an inquiry.

In step S1302, it is determined whether the source of the inquiry received in step S1301 is the PC, i.e., the host computer 300 illustrated in FIG. 1.

The method for determining the inquiry source can be performed by reading a header of a protocol, or by determining whether the inquiry source is a defined application programming interface (API).

Further, it can be determined that if an inquiry about the saving is made, the inquiry source is the PC, and if an inquiry about the user authentication is made, the inquiry source is the printing apparatus.

In step S1302, if it is determined that the inquiry source is the PC (YES in step S1302), the processing proceeds to step S1303. Whereas, if it is determined that the inquiry source is not the PC (NO in step S1302), the processing proceeds to step S1305.

In step S1303, it is determined whether the save data of the host computer 300 can be received by the external information processing apparatus. If it is determined that the save data can be received (YES in step S1303), the processing proceeds to step S1304, and if it is determined that the save data cannot be received (NO in step S1303), the processing proceeds to step S1308.

The external information processing apparatus determines whether it can receive the save data based on whether there is space in the external memory for storing the save data.

In step S1304, the external information processing apparatus notifies the host computer 300 that it can receive the save data, and the processing proceeds to step S1309. Based on the processing in step S1304, the transmission determination unit 303 in the host computer 300 grasps that the save data can be received by the external information processing apparatus and performs the determination in step S907. In step S1309, the external information processing apparatus receives the save data from the host computer 300.

In step S1305, it is determined whether the printer made the inquiry. If it is determined that the printer made the inquiry (YES in step S1305), the processing proceeds to step S1306. Whereas, if it is determined that the printer did not make the inquiry (NO in step S1305), the external information processing apparatus waits until it again receives an inquiry.

In step S1306, the external information processing apparatus executes the user authentication illustrated in FIG. 12. When the user authentication has finished, the processing proceeds to step S1307. In step S1307, the print job is transmitted to the printer, and the external information processing apparatus waits until it again receives an inquiry.

In step S1308, the external information processing apparatus notifies the host computer 300 of the fact that it cannot receive the save data, and waits until it again receives an inquiry.

When the host computer 300 is shutdown, the host computer 300 cannot be shutdown until the secure job 600 in the language monitor 211 has all gone based on the processing in the flowcharts illustrated in FIGS. 8, 9, 12, and 13. Therefore, it can prevent a secure job 600 from losing.

In a fourth exemplary embodiment, secure information is generated by an encryption server. In the present exemplary embodiment, if the authentication unit is in the printer, the encryption server transmits the secure information to the authentication unit in the printer. If the authentication unit is in the encryption server, a program in the encryption server transmits the secure information to the authentication unit. If the authentication unit is in the host computer, the encryption server transmits the secure information to the host computer.

In the present exemplary embodiment, the host computer and the encryption server can be regarded as an integrated information processing apparatus.

Although the above exemplary embodiment is described with reference to the language monitor 211, any device can be employed as long as such device can store a print job. For example, a port monitor and a print processor may be employed.

Further, the printer driver 203 may include a "transmission control unit" and a "transmission determination unit", for example, and these units in the printer driver 203 may execute the above-described processing.

According to the exemplary embodiments of the present invention, confidential printing can be performed regardless of whether print data from a printing apparatus can be received or not.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-139735 filed Jun. 23, 2011, which is hereby incorporated by reference herein in its entirety.

What is claimed is:

1. An information processing apparatus configured to instruct a printing apparatus to perform confidential printing in which print processing is started after authentication processing is performed by transmitting secure information to be used in the authentication processing to an authentication unit which performs the authentication processing and transmitting print data to be used in the print processing by the printing apparatus to the printing apparatus, the information processing apparatus comprising:
a communication unit configured to communicate bidirectionally with the printing apparatus;
an acquisition unit configured to acquire state information indicating whether the print data can be stored in the printing apparatus until the print processing is performed from the printing apparatus by the communication unit; and
a transmission unit configured to, if the state information indicates that the print data can be stored, transmit the secure information to the authentication unit and transmit the print data to the printing apparatus before performing the authentication processing, and if the state information indicates that the print data cannot be stored, transmit the secure information to the authentication unit before performing the authentication processing, and then transmit the print data to the printing apparatus after authentication by the authentication unit based on the secure information.

2. The information processing apparatus according to claim 1, wherein the information processing apparatus includes the authentication unit.

3. The information processing apparatus according to claim 2, wherein if the state information indicates that the print data cannot be stored, the information processing apparatus transmits a dummy job for requesting the printing apparatus to input information to be used in the authentication processing to the printing apparatus before performing the authentication processing.

4. The information processing apparatus according to claim 1, wherein the printing apparatus includes the authentication unit.

5. The information processing apparatus according to claim 1, wherein if the state information indicates that the print data cannot be stored, the transmission unit transmits the print data and information indicating that the print data is a secure job to the printing apparatus when the print data is transmitted to the printing apparatus.

6. The information processing apparatus according to claim 1, wherein the state information indicates a free space in a storage device in the printing apparatus.

7. The information processing apparatus according to claim 1, wherein the state information indicates an upper limit of print jobs that can be stored in a storage device in the printing apparatus and a print job number that is currently stored therein.

8. The information processing apparatus according to claim 1, wherein the state information indicates whether a print job can be stored in a storage device in the printing apparatus.

9. The information processing apparatus according to claim 1, wherein if the secure information is transmitted to the authentication unit but the print data is not transmitted to the printing apparatus, shutdown of the information processing apparatus is blocked.

10. The information processing apparatus according to claim 9, wherein if the secure information is transmitted to the authentication unit, the print data is not transmitted to the printing apparatus, and a setting for saving a print job is set, the print data is saved in an external information processing apparatus.

11. A method for performing control to instruct a printing apparatus to perform confidential printing in which print processing is started after authentication processing is performed by transmitting secure information to be used in the authentication processing to an authentication unit which performs the authentication processing and transmitting print data to be used in the print processing by the printing apparatus to the printing apparatus, the method comprising:
communicating bidirectionally with the printing apparatus;
acquiring state information indicating whether the print data can be stored in the printing apparatus until the print processing is performed from the printing apparatus by the communication; and
if the state information indicates that the print data can be stored, transmitting the secure information to the authentication unit and transmitting the print data to the printing apparatus before performing the authentication processing, and if the state information indicates that the print data cannot be stored, transmitting the secure information to the authentication unit before performing the authentication processing and transmitting the print data to the printing apparatus after authentication by the authentication processing based on the secure information.

12. The method according to claim 11, wherein an information processing apparatus includes the authentication unit.

13. The method according to claim 12, wherein if the state information indicates that the print data cannot be stored, a dummy job for requesting the printing apparatus to input information to be used in the authentication processing is transmitted to the printing apparatus before performing the authentication processing.

14. The method according to claim 11, wherein the printing apparatus includes the authentication unit.

15. The method according to claim 11, further comprising, if the state information indicates that the print data cannot be stored, transmitting the print data and information indicating that the print data is a secure job to the printing apparatus when the print data is transmitted to the printing apparatus.

16. The method according to claim 11, wherein the state information indicates a free space in a storage device in the printing apparatus.

17. The method according to claim 11, wherein the state information indicates an upper limit of print jobs that can be stored in a storage device in the printing apparatus and a print job number that is currently stored therein.

18. The method according to claim 11, wherein the state information indicates whether a print job can be stored in a storage device in the printing apparatus.

19. The method according to claim 11, further comprising, if the secure information is transmitted to the authentication unit and the print data is not transmitted to the printing apparatus, blocking shutdown of an information processing apparatus.

20. The method according to claim 19, further comprising, if the secure information is transmitted to the authentication unit, the print data is not transmitted to the printing apparatus, and a setting for saving a print job is set, saving the print data in an external information processing apparatus.

21. A non-transitory computer readable recording medium recorded with a method that can be executed by a computer that instructs a printing apparatus to perform confidential printing in which print processing is started after authentication processing is performed by transmitting secure information to be used in the authentication processing to an authentication unit which performs the authentication processing and transmitting print data to be used in the print processing by the printing apparatus to the printing apparatus, the computer comprising:

a communication unit configured to communicate bidirectionally with the printing apparatus;

an acquisition unit configured to acquire state information indicating whether the print data can be stored in the printing apparatus until the print processing is performed from the printing apparatus by the communication unit; and a transmission unit configured to, if the state information indicates that the print data can be stored, transmit the secure information to the authentication unit and transmit the print data to the printing apparatus before performing the authentication processing, and if the state information indicates that the print data cannot be stored, transmit the secure information to the authentication unit before performing the authentication processing, and then transmit the print data to the printing apparatus after authentication by the authentication unit based on the secure information.

* * * * *